(12) United States Patent
Hattori et al.

(10) Patent No.: US 7,470,374 B2
(45) Date of Patent: Dec. 30, 2008

(54) MANUFACTURING METHOD AND MANUFACTURING APPARATUS OF MAGNETIC RECORDING MEDIUM

(75) Inventors: Kazuhiro Hattori, Tokyo (JP); Mitsuru Takai, Tokyo (JP); Shuichi Okawa, Tokyo (JP)

(73) Assignee: TDK Corporation, Tokyo (JP)

( * ) Notice: Subject to any disclaimer, the term of this patent is extended or adjusted under 35 U.S.C. 154(b) by 357 days.

(21) Appl. No.: 10/535,265

(22) PCT Filed: Jul. 28, 2004

(86) PCT No.: PCT/JP2004/010710

§ 371 (c)(1),
(2), (4) Date: May 17, 2005

(87) PCT Pub. No.: WO2005/013264

PCT Pub. Date: Feb. 10, 2005

(65) Prior Publication Data
US 2006/0021966 A1    Feb. 2, 2006

(30) Foreign Application Priority Data
Jul. 31, 2003 (JP) ............................. 2003-283567

(51) Int. Cl.
*C23F 1/00* (2006.01)
*H01L 21/306* (2006.01)
(52) U.S. Cl. .......................................... 216/22; 216/41
(58) Field of Classification Search .................. None
See application file for complete search history.

(56) References Cited

U.S. PATENT DOCUMENTS

| 4,632,898 | A |   | 12/1986 | Fister et al. |
|---|---|---|---|---|
| 5,240,554 | A | * | 8/1993 | Hori et al. .................... 438/702 |
| 5,378,316 | A | * | 1/1995 | Franke et al. ................... 216/2 |
| 5,789,320 | A | * | 8/1998 | Andricacos et al. ......... 438/678 |
| 5,910,864 | A | * | 6/1999 | Hira et al. ................. 360/235.9 |
| 5,991,118 | A | * | 11/1999 | Kasamatsu et al. ........ 360/236.6 |
| 6,324,032 | B1 | * | 11/2001 | Ohtsuka et al. ............. 360/131 |
| 6,348,405 | B1 | * | 2/2002 | Ohuchi ....................... 438/636 |
| 6,383,907 | B1 | * | 5/2002 | Hasegawa et al. ........... 438/597 |
| 6,689,622 | B1 | * | 2/2004 | Drewes ......................... 438/3 |
| 6,748,865 | B2 | * | 6/2004 | Sakurai et al. .............. 101/483 |
| 6,806,096 | B1 | * | 10/2004 | Kim et al. ...................... 438/3 |
| 6,875,664 | B1 | * | 4/2005 | Huang et al. ................ 438/299 |
| 6,884,630 | B2 | * | 4/2005 | Gupta et al. .................... 438/3 |
| 6,884,733 | B1 | * | 4/2005 | Dakshina-Murthy et al. ..... 438/717 |

(Continued)

FOREIGN PATENT DOCUMENTS

JP    A-57-030130    2/1982

(Continued)

*Primary Examiner*—Allan Olsen
(74) *Attorney, Agent, or Firm*—Oliff & Berridge, PLC

(57) ABSTRACT

A manufacturing method of a magnetic recording medium, and the like are provided, which can suppress misalignment of a processed shape of divided recording elements and magnetic degradation and can efficiently manufacture a magnetic recording medium having good magnetic characteristics. In the manufacturing method, ion beam etching is used as a dry etching technique for a continuous recording layer 20. Before dry etching of the continuous recording layer 20, a resist layer 26 is removed. As the material for a first mask layer covering the continuous recording layer, diamond like carbon is used.

12 Claims, 14 Drawing Sheets

U.S. PATENT DOCUMENTS

| | | | |
|---|---|---|---|
| 6,977,108 B2* | 12/2005 | Hieda et al. | 428/64.2 |
| 6,984,529 B2* | 1/2006 | Stojakovic et al. | 438/3 |
| 6,989,332 B1* | 1/2006 | Bell et al. | 438/719 |
| 7,050,326 B2* | 5/2006 | Anthony | 365/158 |
| 2003/0164354 A1* | 9/2003 | Hsieh et al. | 216/22 |
| 2004/0016918 A1* | 1/2004 | Amin et al. | 257/14 |
| 2004/0191577 A1* | 9/2004 | Suwa et al. | 428/694 TP |
| 2004/0224512 A1* | 11/2004 | Sato et al. | 438/689 |
| 2004/0229470 A1* | 11/2004 | Rui et al. | 438/710 |
| 2004/0259355 A1* | 12/2004 | Yin et al. | 438/689 |
| 2005/0112506 A1* | 5/2005 | Czech et al. | 430/322 |
| 2005/0118817 A1* | 6/2005 | Fujita et al. | 438/689 |
| 2005/0157376 A1* | 7/2005 | Huibers et al. | 359/291 |
| 2005/0175791 A1* | 8/2005 | Hattori et al. | 427/548 |
| 2005/0181604 A1* | 8/2005 | Sperlich et al. | 438/671 |
| 2005/0213239 A1* | 9/2005 | Hibi et al. | 360/48 |
| 2005/0214583 A1* | 9/2005 | Ito et al. | 428/800 |
| 2005/0221512 A1* | 10/2005 | Ito et al. | 438/3 |
| 2005/0243467 A1* | 11/2005 | Takai et al. | 360/135 |
| 2005/0284842 A1* | 12/2005 | Okawa et al. | 216/22 |
| 2005/0287397 A1* | 12/2005 | Soeno et al. | 428/831 |
| 2006/0046200 A1* | 3/2006 | Abatchev et al. | 430/313 |
| 2006/0065286 A1* | 3/2006 | Rana et al. | 134/1.2 |
| 2007/0161251 A1* | 7/2007 | Tran et al. | 438/725 |

FOREIGN PATENT DOCUMENTS

| | | |
|---|---|---|
| JP | A-61-240452 | 10/1986 |
| JP | A-03-040219 | 2/1991 |
| JP | 06020230 A * | 1/1994 |
| JP | A-09-097419 | 4/1997 |
| JP | A-09-106584 | 4/1997 |
| JP | A-2000-322710 | 11/2000 |
| JP | A-2001-167420 | 6/2001 |
| JP | 2001185531 A * | 7/2001 |
| JP | A-2001-243665 | 9/2001 |
| JP | A-2003-157520 | 5/2003 |

* cited by examiner

MANUFACTURING METHOD AND MANUFACTURING APPARATUS OF MAGNETIC RECORDING MEDIUM

TECHNICAL FIELD

The present invention relates to a manufacturing method of a magnetic recording medium and a manufacturing apparatus of the same.

BACKGROUND ART

Conventionally, in a magnetic recording medium such as a hard disc, various improvements such as miniaturization of magnetic particles forming a recording layer, material change for the magnetic particles, and increased precision in the head processing, have been made to largely improve areal density. A further improvement in the areal density is expected.

However, many problems including the limitation of the head processing, side fringes caused by broadening of a magnetic field, crosstalk, and the like are made apparent. Thus, the improvement in the areal density by the conventional improvement approach has reached the limit. Therefore, as a candidate of a magnetic recording medium that enables further improvement in the areal density, a discrete type magnetic recording medium in which a continuous recording layer is divided into a number of divided recording elements has been proposed, as described in Japanese Patent Laid-Open Publication No. Hei 9-97419, for example.

As a processing technique for achieving fine division of the continuous recording layer, dry etching processes as described in Japanese Patent Laid-Open Publication No. Hei 12-322710, for example, ion beam etching, and reactive ion etching using CO (carbon monoxide) gas with a nitrogen-containing gas such as $NH_3$ (ammonia) gas added thereto as a reactive gas can be used.

As a technique for processing a mask layer for dry etching in a predetermined pattern, techniques used in the art of semiconductor manufacturing, such as lithography using a resist layer, can be used.

DISCLOSURE OF THE INVENTION

In the case where a conventional dry etching technique such as reactive ion etching is used, it is possible to divide the continuous recording layer into a number of divided recording elements in a fine pattern. However, in this case, precision in the processing of divided recording elements may vary depending on a position on the magnetic recording medium or the divided recording elements may be overheated and magnetically degraded. Moreover, a step portion like a burr may be formed along the peripheral portion of the divided recording element or the divided recording element may be formed to have tapered side faces. In other words, a certain degree of misalignment may occur between a desired shape and an actually processed shape. Because of the magnetic degradation and the misalignment of the processed shape of the divided recording element as described above, desired magnetic characteristics are not be achieved in some cases.

For example, in reactive ion etching, a distribution of plasma tends to be unstable near an end of an object to be processed, and the precision in the processing of the divided recording element near the end of the object to be processed tends to be lower.

In addition, reactive ion etching using as a reactive gas CO (carbon monoxide) gas or the like which is used for processing a magnetic material requires a large bias power and therefore the temperature of the object to be processed easily increases. Thus, the divided recording elements may be overheated and magnetically degraded.

The above overheating of the divided recording element can be prevented by providing a cooling apparatus. However, provision of the cooling apparatus makes the structure of the manufacturing apparatus complicated and increases the cost. Moreover, since the plasma distribution tends to be unstable near the end of the object to be processed, the temperature distribution easily becomes uneven accordingly and it is difficult to uniformly cool the object to be processed.

Moreover, in order to mass-produce a magnetic recording medium, it is desirable that a plurality of objects to be processed be arranged side by side and be processed at the same time. However, since the cooling apparatus typically includes an ESC (electrostatic chuck) and a bias application apparatus, when a plurality of objects to be processed are disposed in a line, it is difficult to provide such a cooling apparatus for the reasons of the space, the precision in the processing, and the like. Thus, it is difficult to simultaneously process a plurality of objects to be processed by reactive ion etching in which the objects to be processed are to be cooled, in order to mass-produce a discrete type magnetic recording medium.

On the other hand, the use of ion beam etching can solve the aforementioned problems. However, in this case, there is a problem that a step portion like a burr can be easily formed along the peripheral portion of the divided recording element.

This problem is described in more detail. As shown in FIG. 22A, when an exposed portion of a continuous recording layer 100 which is not covered with a mask 102 is processed by ion beam etching, removal of the continuous recording layer 100 and re-deposition of a part of removed particles on the side face 102A of the mask 102 are repeated. The re-deposited particles are removed by ion beams sequentially when the amount of the re-deposited particles is not large. However, when the amount of the re-deposited particles is large, a part of them is deposited on the side face 102A of the mask 102, as shown in FIG. 22B, and finally forms a step portion 106 in the peripheral portion of the divided recording element 104, as shown in FIG. 22C. This phenomenon can occur in dry etching in general. Especially, this phenomenon can occur in ion beam etching significantly. In order to suppress this phenomenon, a technique is known in which ion beams or the like are made incident on a surface of an object to be processed from a direction inclined from the normal of the surface of the object to be processed, so as to efficiently remove the re-deposited particles from the side face of the object to be processed and the like. However, this technique is not effective in the case where a pattern is fine, as in a discrete type magnetic recording medium.

Furthermore, when dry etching is used, it is difficult to form a divided recording element 200 having an ideal shape in which its side face 200A stands approximately vertically, as shown in FIG. 23A. In fact, the divided recording element 200 is formed to have a tapered side face 200A, as shown in FIG. 23B.

More specifically, in dry etching, a part of gas approaches an object to be processed from a direction slightly inclined from a direction vertical to the object to be processed. Thus, an end of a region to be etched is in the shadow of mask 202 with respect to the gas that approaches the object to be processed at an angle, even if that end is not covered with the mask 202. Therefore, etching progresses more slowly at the end of the region to be etched than in other portions, resulting in the tapered side face 200A of the divided recording element 200.

In view of the foregoing problems, the present invention provides a manufacturing method of a magnetic recording medium and a manufacturing method of the same, which can suppress misalignment of a processed shape of a divided recording element and magnetic degradation of the divided recording element, and can efficiently manufacture a magnetic recording medium having good magnetic characteristics.

The present invention uses ion beam etching as a dry etching technique for a continuous recording layer, thereby suppressing reduction of the precision in the processing of the continuous recording layer near an end of an object to be processed and suppressing the process temperature of the continuous recording layer to prevent or reduce magnetic degradation of divided recording elements.

Moreover, the present invention makes a covering component on the continuous recording layer thinner by removing a resist layer on a mask layer covering the continuous recording layer before dry etching of the continuous recording layer, so as to suppress formation of a step portion in the peripheral portion of the divided recording element and a tapered angle of the side face of the divided recording element and to improve the process precision of the divided recording elements.

As the material for the mask layer covering the continuous recording layer, diamond like carbon is preferable. This is because that material has a low etching rate with respect to ion beam etching and therefore can be formed to be thinner. In addition, control of the processed shape is relatively easy for diamond like carbon.

In the present specification, the term "diamond like carbon" (hereinafter, simply referred to as "DLC") is used to mean a material that is mainly composed of carbon, has an amorphous structure, and has Vickers hardness of approximately 200 to approximately 8000 $kgf/mm^2$.

Moreover, in the present specification, the term "ion beam etching" is used to collectively mean processing methods for making ionized gas incident on an object to be processed to remove that object, such as ion milling, but is not limited to processing methods which converge ion beams and make them incident on the object to be processed.

Furthermore, in the present specification, the term "magnetic recording medium" is not limited to a hard disc, a floppy (registered trademark) disc, a magnetic tape, and the like, which use only magnetism for recording and reproducing information. This term is also used to mean a magnetooptical recording medium such as an MO (Magneto Optical), which uses magnetism and light, and a heat-assisted recording medium that uses magnetism and heat.

The foregoing object can be achieved by the invention as described below.

(1) A manufacturing method of a magnetic recording medium comprising: a resist layer processing step of processing a resist layer of an object to be processed in a predetermined pattern, in the object a continuous recording layer, a mask layer, and the resist layer being formed on a surface of a substrate in that order; a mask layer processing step of processing the mask layer in the pattern based on the resist layer; a resist layer removal step of removing the resist layer on the mask layer; and a continuous recording layer processing step of processing the continuous recording layer in the pattern by dry etching based on the mask layer to divide the continuous recording layer into a number of divided recording elements, wherein the resist layer removal step is performed before the continuous recording layer processing step.

(2) The manufacturing method of a magnetic recording medium according to (1), wherein: the mask layer includes a layer having a lower etching rate in the continuous recording layer processing step than that of the continuous recording layer; and the layer is formed to be thinner than the continuous recording layer.

(3) The manufacturing method of a magnetic recording medium according to (2), wherein the layer of the mask layer, which has the lower etching rate in the continuous recording layer processing step than that of the continuous recording layer, has a thickness t that satisfies $3 \leq t \leq 15$ nm.

(4) The manufacturing method of a magnetic recording medium according to (2), wherein the layer of the mask layer, which has the lower etching rate in the continuous recording layer processing step than that of the continuous recording layer, has a thickness t that satisfies $3 \leq t \leq 10$ nm.

(5) The manufacturing method of a magnetic recording medium according to any one of (2) to (4), wherein the layer of the mask layer, which has the lower etching rate in the continuous recording layer processing step than that of the continuous recording layer, is made of diamond like carbon.

(6) The manufacturing method of a magnetic recording-medium according to any one of (1) to (5), wherein the continuous recording layer processing step processes the continuous recording layer by ion beam etching.

(7) The manufacturing method of a magnetic recording medium according to any one of (1) to (6), wherein: the mask layer includes a first mask layer and a second mask layer arranged between the first mask layer and the resist layer, the first mask layer having a lower etching rate in the continuous recording layer processing step than that of the continuous recording layer, the second mask layer having a lower etching rate in the resist layer removal step than that of the first mask layer; and the mask layer processing step includes: a second mask layer processing step of processing the second mask layer in the pattern based on the resist layer; and a first mask layer processing step of processing the first mask layer in the pattern based on the second mask layer.

(8) The manufacturing method of a magnetic recording medium according to (7), wherein the resist layer removal step also serves as the first mask layer processing step.

(9) The manufacturing method of a magnetic recording medium according to (8), wherein the resist layer removal step removes the resist layer and processes the mask layer by employing reactive ion etching which uses one of oxygen and ozone as a reactive gas.

(10) The manufacturing method of a magnetic recording medium according to (8) or (9), wherein the second mask layer is formed to be sufficiently thin and/or is formed of a material having a higher etching rate in the continuous recording layer processing step than that of the continuous recording layer, for enabling the second mask layer on the first mask layer to be removed in the continuous recording layer processing step.

(11) The manufacturing method of a magnetic recording medium according to any one of (8) to (10), wherein the second mask layer is formed of a silicon-based material that comprises at least one of silicon or a silicon compound.

(12) The manufacturing method of a magnetic recording medium according to any one of (8) to (11), wherein the second mask layer processing step processes the second mask layer by employing reactive ion etching which uses a fluorinated gas as a reactive gas.

(13) The manufacturing method of a magnetic recording medium according to any one of (1) to (12), wherein the resist layer processing step processes the resist layer by imprinting.

(14) The manufacturing method of a magnetic recording medium according to any one of (1) to (13), wherein a plurality of objects to be processed are simultaneously processed.

(15) A manufacturing method of a magnetic recording medium, comprising: a resist layer processing step of processing a resist layer of an object to be processed in a predetermined pattern, in the object a continuous recording layer, a mask layer, and the resist layer being formed on a surface of a substrate in that order; a mask layer processing step of processing the mask layer in the pattern based on the resist layer; a resist layer removal step for removing the resist layer on the mask layer; and a continuous recording layer processing step of processing the continuous recording layer in the pattern by ion beam etching based on the mask layer to divide the continuous recording layer into a number of divided recording elements, wherein the resist layer removal step is performed before the continuous recording layer processing step.

(16) A manufacturing apparatus of a magnetic recording medium, comprising: a processing device for performing the manufacturing method of a magnetic recording medium according to any one of (1) to (15); and a holder for simultaneously holding a plurality of objects to be processed, wherein the manufacturing device is configured to process the plurality of objects to be processed simultaneously.

(17) The manufacturing apparatus of a magnetic recording medium according to (16), wherein an ion beam etching device for processing the continuous recording layer is provided.

According to the present invention, advantageous effects that misalignment of the processed shape of the divided recording elements and the magnetic degradation of the divided recording elements can be suppressed and a magnetic recording medium having good magnetic characteristics can be surely and efficiently manufactured can be achieved.

BEST MODE FOR CARRYING OUT THE INVENTION

Various exemplary embodiments of this invention will be hereinafter described in detail with reference to the drawings.

Figure 1:
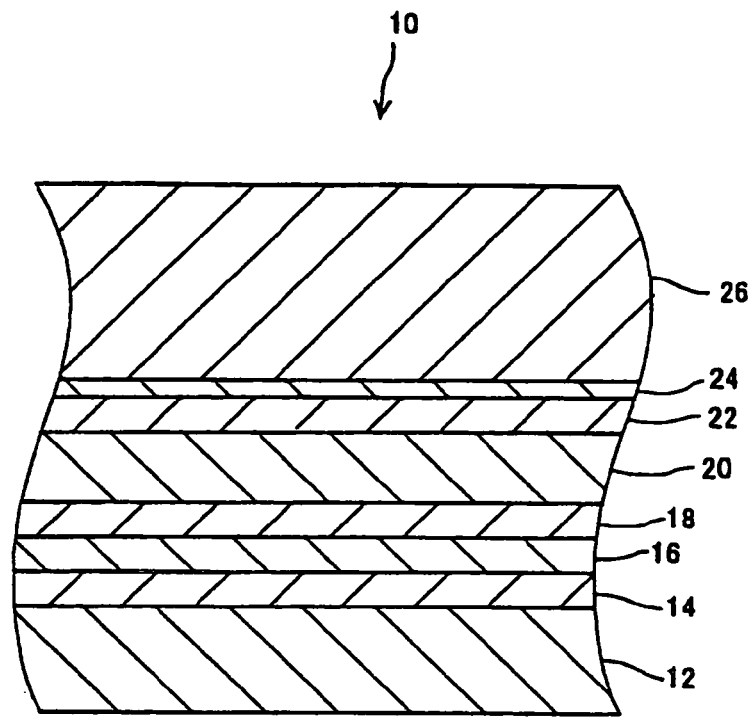
FIG. 1 is a side cross-sectional view schematically showing a structure of an object to be processed as a starting body according to an exemplary embodiment of the present invention.
Figure 2:
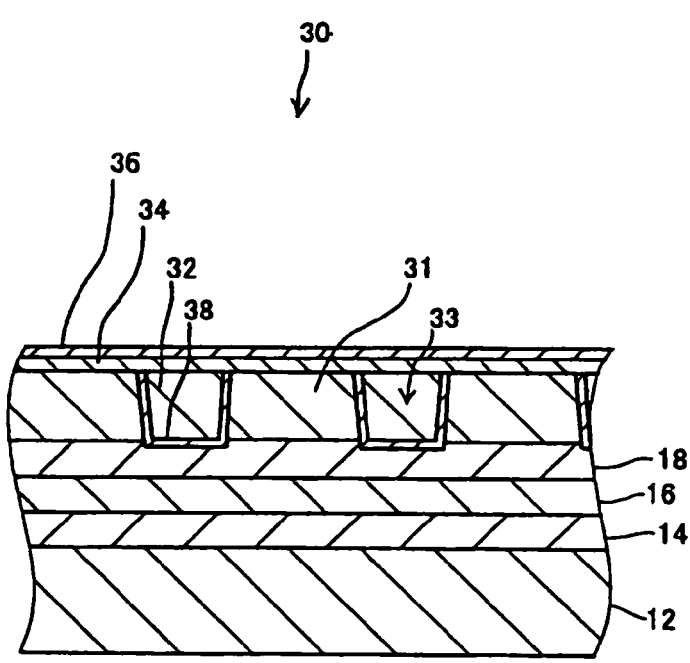
FIG. 2 is a side cross-sectional view schematically showing the structure of the magnetic recording medium obtained by processing the above object to be processed.

The present exemplary embodiment relates to a manufacturing method of a magnetic recording medium, which processes an object to be processed as a starting body of a magnetic recording medium shown in FIG. 1, by dry etching or the like so as to process a continuous recording layer in a shape of a servo pattern (not shown) including a predetermined line and space pattern, as shown in FIG. 2, and contact holes, thereby dividing the continuous recording layer into a number of divided recording elements. The present exemplary embodiment has features in a technique for processing the continuous recording layer, materials for a mask layer and a resist layer which cover the continuous recording layer, techniques for processing those layers, and the like. Moreover, the present exemplary embodiment has a feature in a manufacturing apparatus of a magnetic recording medium for performing the above processing techniques of the continuous recording layer and the like to mass-produce the magnetic recording medium. Except for those points, the manufacturing method and the manufacturing apparatus of the present exemplary embodiment are the same as a conventional manufacturing method of a magnetic recording medium and a conventional manufacturing apparatus of the same. Thus, the description is omitted in an appropriate manner.

An object to be processed 10 is an approximately circular disc having a central hole (not shown). As shown in FIG. 1, the object to be processed 10 includes a glass substrate 12 and an underlayer 14, a soft magnetic material layer 16, a seed layer 18, a continuous recording layer 20, a first mask layer 22, a second mask layer 24, and a resist layer 26 formed on the glass substrate 12 in that order.

The underlayer 14 is made of Cr (chrome) or a Cr alloy. The soft magnetic material layer 16 is made of an Fe (iron) alloy or a Co (cobalt) alloy. The seed layer 18 is made of CoO, MgO, NiO, or the like. The continuous recording layer 20 is made of a Co (cobalt) alloy. The first mask layer 22 is made of DLC. The second mask layer 24 is made of Si (silicon). The resist layer 26 is made of a negative resist (NEB22A manufactured by Sumitomo Chemical Co., Ltd.).

As shown in FIG. 2, a magnetic recording medium 30 is a perpendicular recording, discrete track type magnetic disc. In the magnetic recording medium 30, the aforementioned continuous recording layer 20 is divided into a number of divided recording elements 31 at fine intervals in a radial direction of tracks. Groove portions 33 between the divided recording elements 31 are filled with a non-magnetic material 32. On the divided recording elements 31 and the non-magnetic material 32, a protection layer 34 and a lubricating layer 36 are formed in that order. In addition, a barrier 38 is formed between the divided recording elements 31 and the non-magnetic material 32.

The non-magnetic material 32 is $SiO_2$ (silicon dioxide) The protection layer 34 and the barrier 38 are formed by layers of the aforementioned hard carbon called as DLC. The material for the lubricating layer 34 is PFPE (perfluoropolyether).

Figure 3:
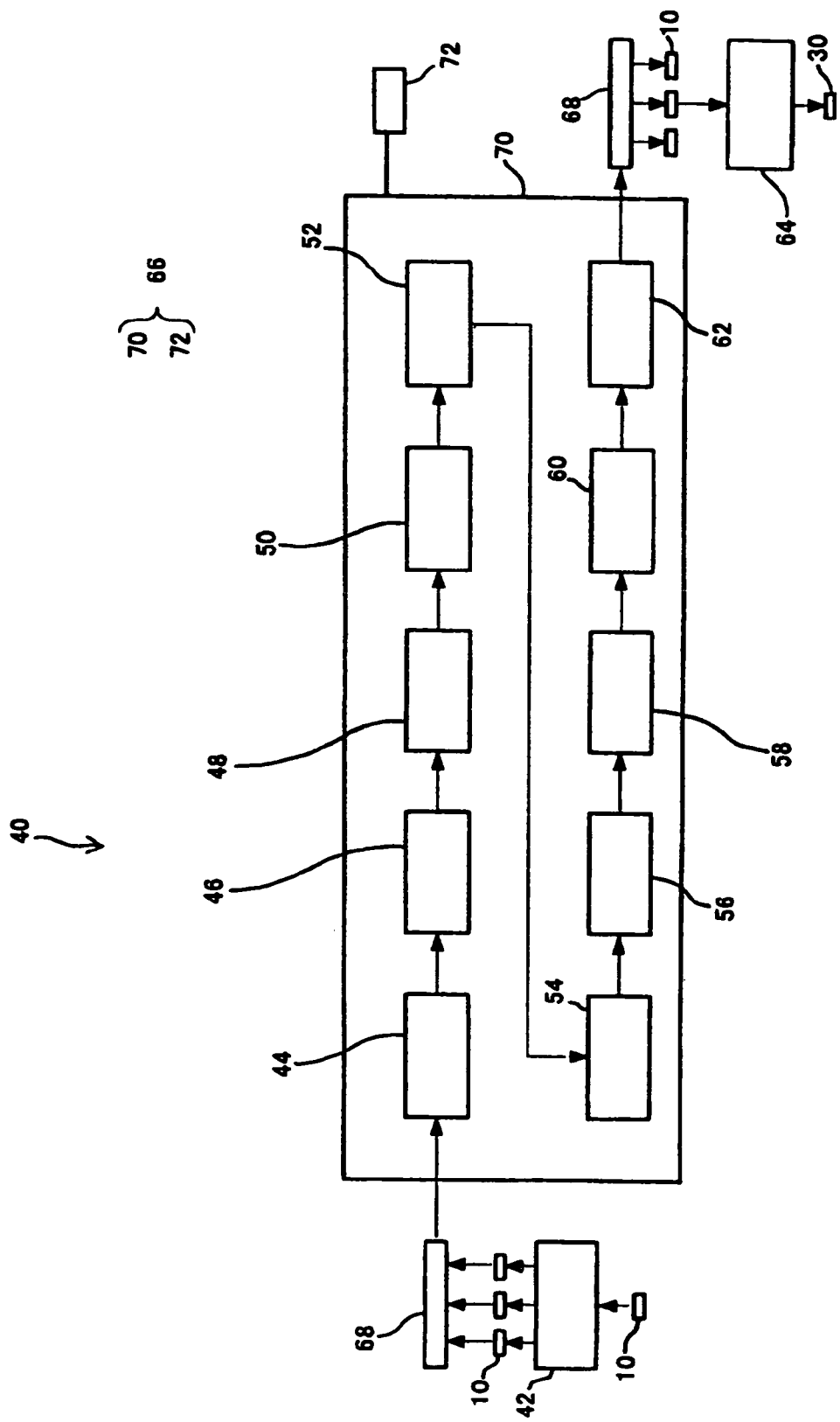
FIG. 3 is a block diagram schematically showing a manufacturing apparatus for processing the magnetic recording medium.

As shown in FIG. 3, a manufacturing apparatus 40 of a magnetic recording medium includes a transfer device 42, an ashing device 44, reactive ion etching devices 46 and 48, an ion beam etching device 50, an ashing device 52, a dry cleaning device 54, a barrier formation device 56, a non-magnetic material filling device 58, a flattening device 60, a protection layer formation device 62, and a lubricating layer formation device 64 for forming the lubricating layer 36.

The manufacturing apparatus 40 also includes a vacuum keeping device 66 for accommodating the ashing device 44, the reactive ion etching devices 46 and 48, the ion beam etching device 50, the ashing device 52, the dry cleaning device 54, the barrier formation device 56, the non-magnetic material filling device 58, the flattening device 60, and the protection layer formation device 62 and for keeping the surrounding of an object to be processed 10 in a vacuum state.

Figure 4:
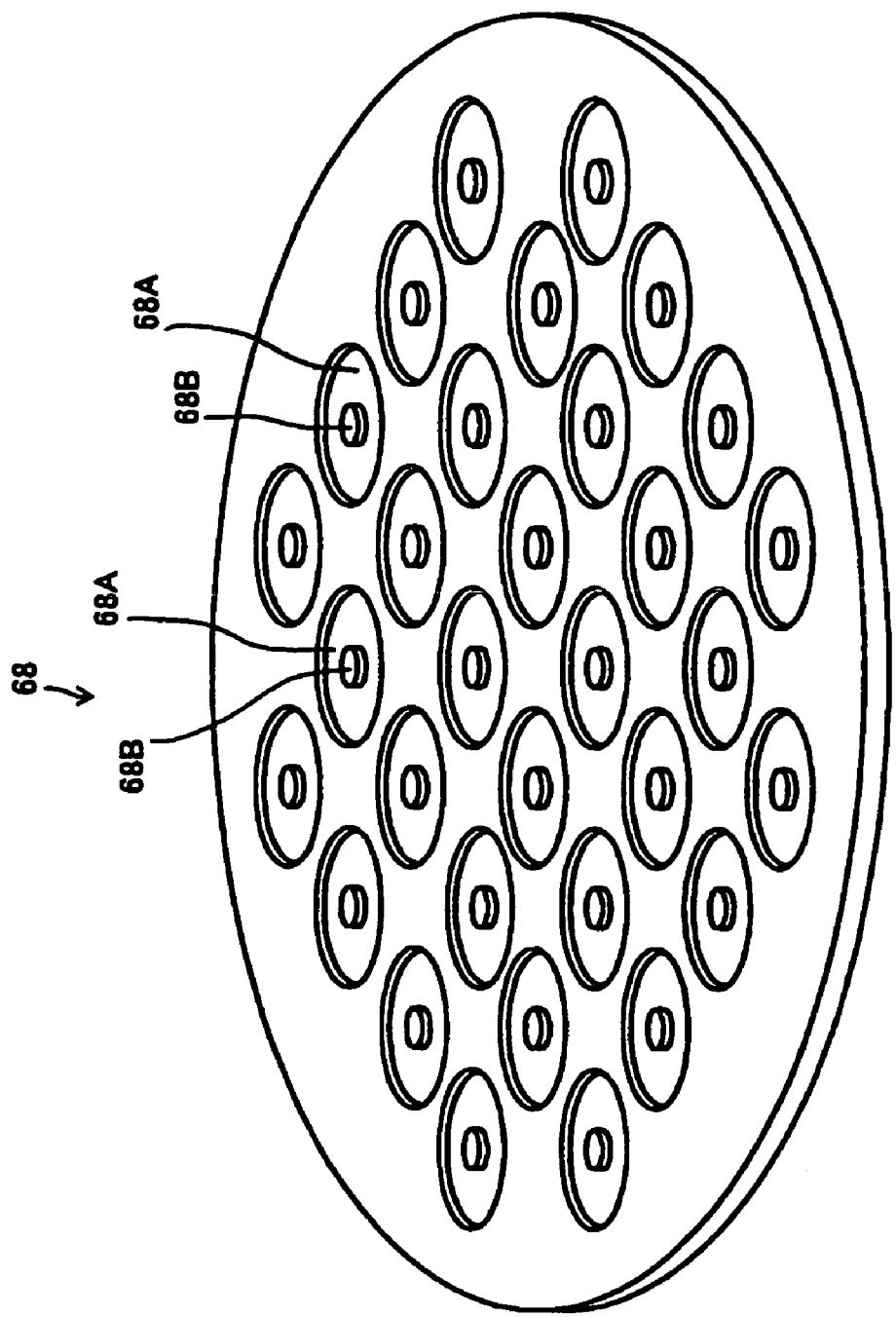
FIG. 4 is a perspective view generally showing a structure of a holder included in the above manufacturing apparatus.

Moreover, the manufacturing apparatus 40 includes a holder 68 for holding a plurality of objects to be processed 10 simultaneously, as shown in FIG. 4, and an automating transport device (not shown) for automatically transporting the holder 68. Thus, the manufacturing apparatus 40 can simultaneously process a plurality of objects to be processed 10.

The transfer device 42 is a press device for pressing a mold (not shown) produced by lithography or the like to the resist layer 26 so as to transfer a predetermined pattern onto the resist layer 26 and form grooves. The transfer device 42 uses a nano-imprinting method.

The ashing device 44 is configured to remove the resist layer 26 at the bottom of the grooves that is left after nano-imprinting, by ashing using oxygen, ozone, or plasma of oxygen or ozone.

The reactive ion etching device 46 is configured to remove the second mask layer 24 at the bottom of the grooves by reactive ion etching using a fluorinated gas such as $CF_4$ (carbon tetrafluoride) gas or $SF_6$ (sulfur hexafluoride) gas as a reactive gas.

Figure 5:
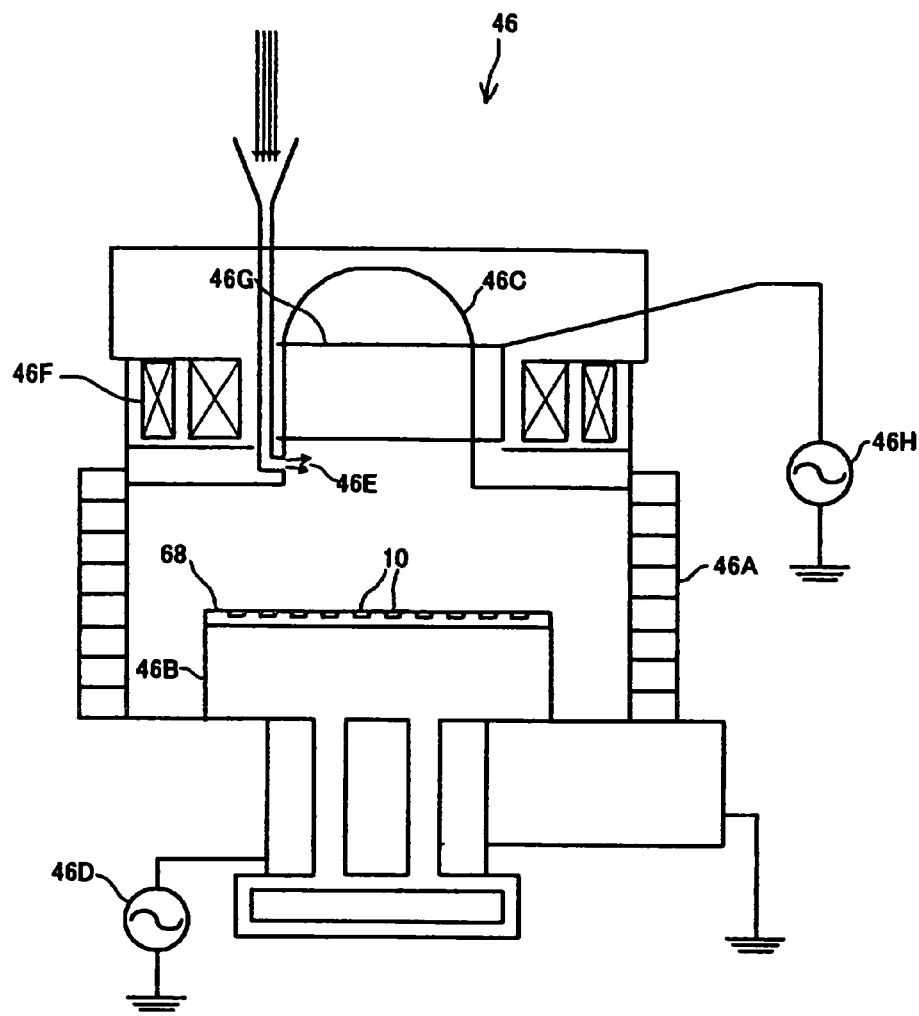
FIG. 5 is a side view schematically showing a structure of a reactive ion etching device included in the above manufacturing apparatus.

More specifically, as shown in FIG. 5, the reactive ion etching device 46 is a helicon wave plasma type device, and includes a diffusion chamber 46A, an ESC (electrostatic chuck) stage electrode 46B for placing the holder 68 within the diffusion chamber 46A, and a quartz bell jar 46C for generating plasma.

To the ESC stage electrode 46B, a bias supply 46D for applying a bias voltage is connected by wiring. The bias supply is an AC power source having a frequency of 1.6 MHz.

The quartz bell jar 46C has an opening at its lower end, which faces the inside of the diffusion chamber 46A. In a lower part of the quartz bell jar 46C, a gas supply hole 46E for supplying a reactive gas is provided. Moreover, an electromagnetic coil 46F and an antenna 46G are provided around the quartz bell jar 46C. To the antenna 46G, a plasma-generating power supply 46H is connected by wiring. The plasma-generating power supply 46H is an AC power source having a frequency of 13.56 MHz.

The reactive ion etching device 48 is configured to remove the resist layer 26 in regions other than the grooves by reactive ion etching using oxygen or ozone as a reactive gas and to remove the first mask layer at the bottom of the grooves. Please note that the reactive ion etching device 48 has the same structure as the reactive ion etching device 46, although they use different types of reactive gas.

The ion beam etching device 50 is configured to remove the continuous recording layer 20 at the bottom of the grooves by ion beam etching using Ar (argon) gas, thereby dividing the continuous recording layer 20 into a number of divided recording elements 31.

Figure 6:
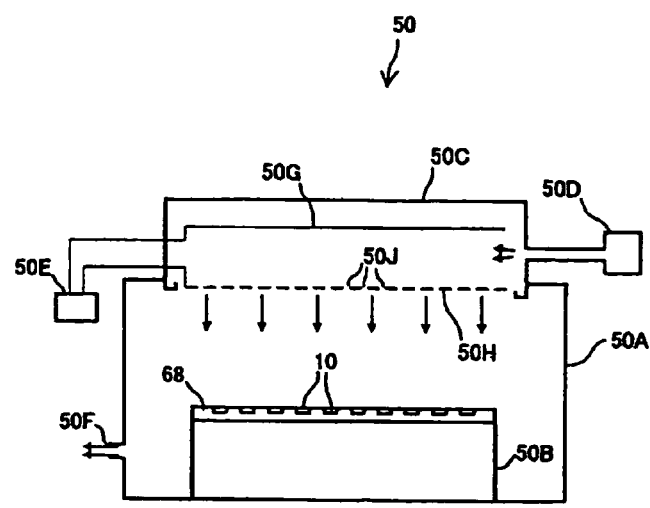
FIG. 6 is a side view schematically showing a structure of an ion beam etching device included in the above manufacturing apparatus.

More specifically, as shown in FIG. 6, the ion beam etching device 50 includes a vacuum chamber 50A, an ESC (electrostatic chuck) stage electrode 50B for placing the holder 68 within the vacuum chamber 50A, an ion gun 50C for generating ions and making them incident on the stage electrode 50B, a gas supply part 50D for supplying argon gas to the ion gun 50C, and a power supply 50E for applying a beam voltage to the ion gun 50C. The vacuum chamber 50A is provided with an exhaust hole 50F for discharging argon gas.

The ion gun 50C includes an anode 50G connected to the power supply 50E by wiring, and a cathode 50H. The cathode 50H is provided with a number of fine holes 50J through which ionized argon gas is radiated and emitted.

The ashing device 52 is configured to remove the first mask layer 22 remaining on the divided recording elements 31 by ashing using oxygen, ozone, or plasma of oxygen or ozone.

The dry cleaning device 54 is configured to remove foreign particles in the surrounding of the divided recording elements 31 by using plasma.

The barrier formation device 56 is a CVD device for forming the barrier 38 of DLC on the divided recording elements 31 by CVD (Chemical Vapor Deposition).

The non-magnetic material filling device 58 is a bias sputtering device for filling the groove portions 33 between the divided recording elements 31 with a non-magnetic material 32 of $SiO_2$ by bias sputtering.

The flattening device 60 is an ion beam etching device for flattening a surface of a medium by ion beam etching using Ar gas.

The protection layer formation device 62 is a CVD device for forming the protection layer 34 of DLC by CVD on the divided recording elements 31 and the non-magnetic material 32.

The lubricating layer formation device 64 is a dipping device for applying the lubricating layer 36 of PFPE by dipping onto the protection layer 34.

The vacuum keeping device 66 is configured to include a vacuum chamber 70 and a vacuum pump 72 that is in communication with the vacuum chamber 70.

The holder 68 is an approximately circular disc made of a conductive material, and has a plurality of circular depressions 68A into which objects to be processed 10 fit to be held, respectively. Near the center of each circular depression 68A, a circular step portion 68B is formed in such a manner that an object to be processed 10 having a central hole fits into the circular depression 68A at both the inner circumference and the outer circumference.

Figure 7:
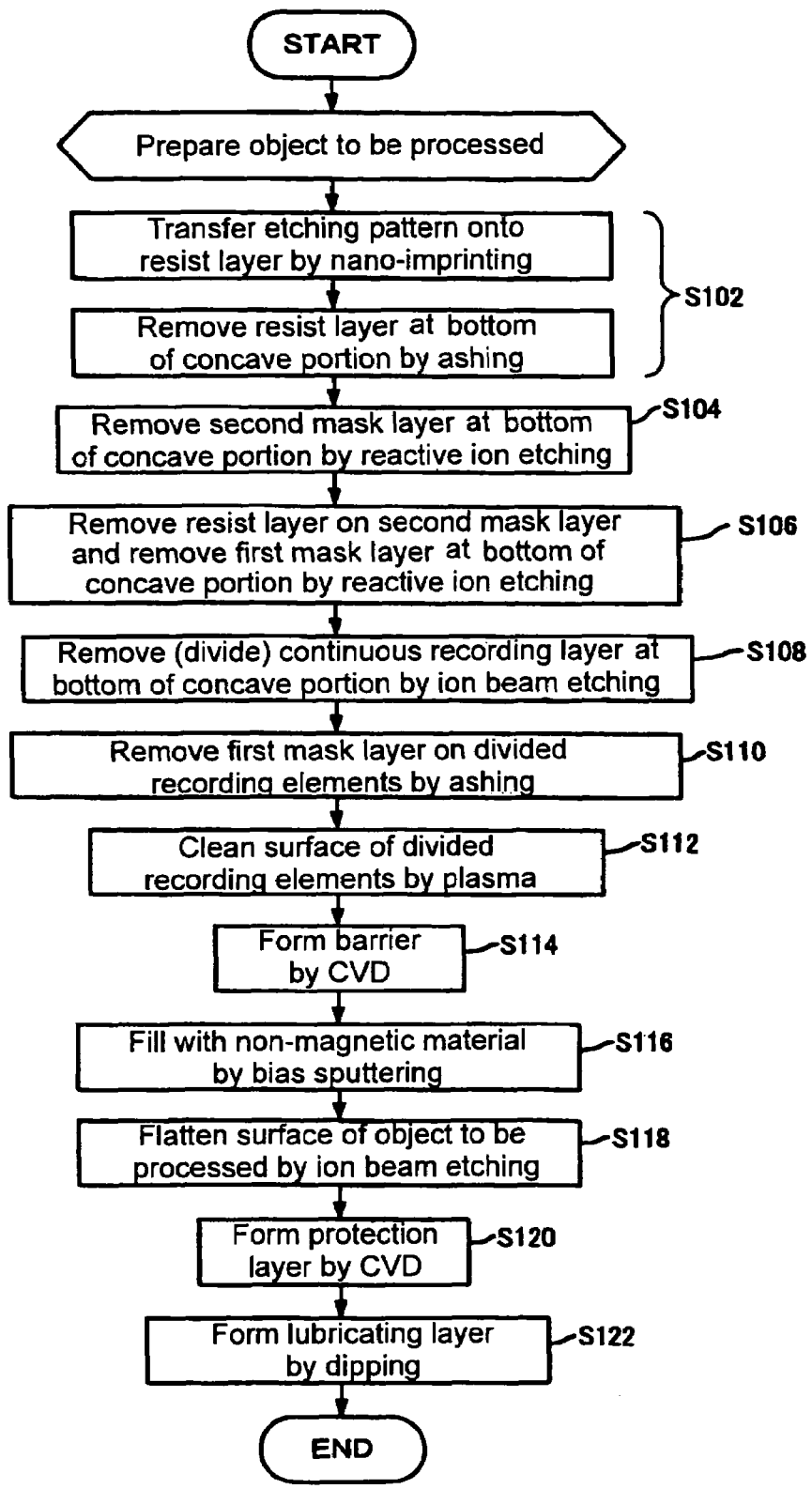
FIG. 7 is a flowchart of a manufacturing process of a magnetic recording medium.

Next, an operation of the manufacturing apparatus 40 of a magnetic recording medium is described, referring to the flowchart shown in FIG. 7, and the like.

First, an object to be processed 10 is prepared. The object to be processed 10 is obtained by forming the underlayer 14 having a thickness of 30 to 2000 nm, the soft magnetic material layer 16 having a thickness of 50 to 300 nm, the seed layer 18 having a thickness of 3 to 30 nm, the continuous recording layer 20 having a thickness of 5 to 30 nm, the first mask layer 22 having a thickness of 3 to 20 nm, and the second mask layer 24 having a thickness of 3 to 15 nm on the glass substrate 12 by sputtering in that order and then forming the resist layer 26 having a thickness of 30 to 300 nm on the second mask layer 24 by spin-coating or dipping. It is preferable that the first mask layer 22 be thinner than the continuous recording layer 20. For example, in the case where the continuous recording layer 20 has a thickness of about 20 nm, it is preferable that the first mask layer 22 be formed to have a thickness of 15 nm or less.

Figure 8:
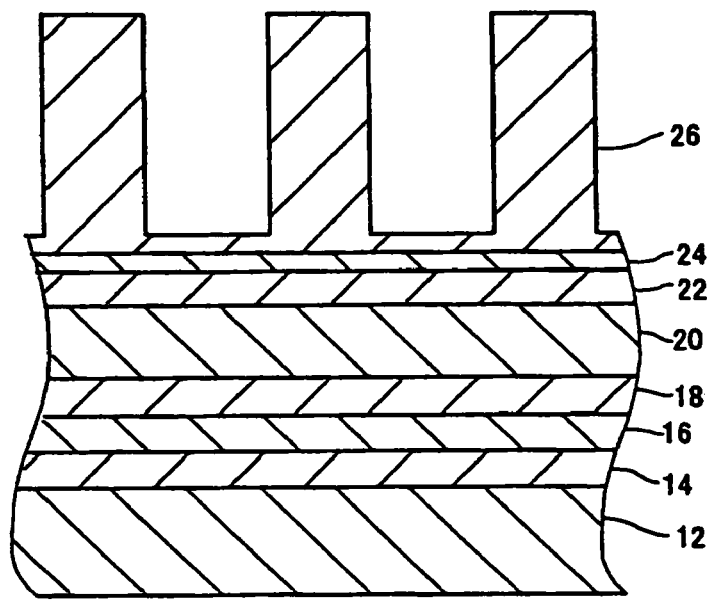
FIG. 8 is a side cross-sectional view schematically showing the shape of the object to be processed in which a division pattern has been transferred onto a resist layer.

Onto the resist layer 26 of the above object to be processed 10, grooves corresponding to the division pattern of the divided recording elements 31, shown in FIG. 8, are transferred by imprinting by means of the transfer device 42. By the use of imprinting, it is possible to efficiently transfer the grooves corresponding to the division pattern onto the object to be processed 10. Alternatively, the grooves corresponding to the division pattern may be transferred onto the object to be processed 10 by lithography or the like. Then, a plurality of objects to be processed 10 in each of which the grooves have been formed in the aforementioned manner are attached to the holder 68 and are transported into the vacuum chamber 70. The thus transported holder 68 is automatically transported to the various processing devices within the vacuum chamber 70 by a transport device (not shown), and the plurality of objects to be processed 10 are processed simultaneously.

Figure 9:
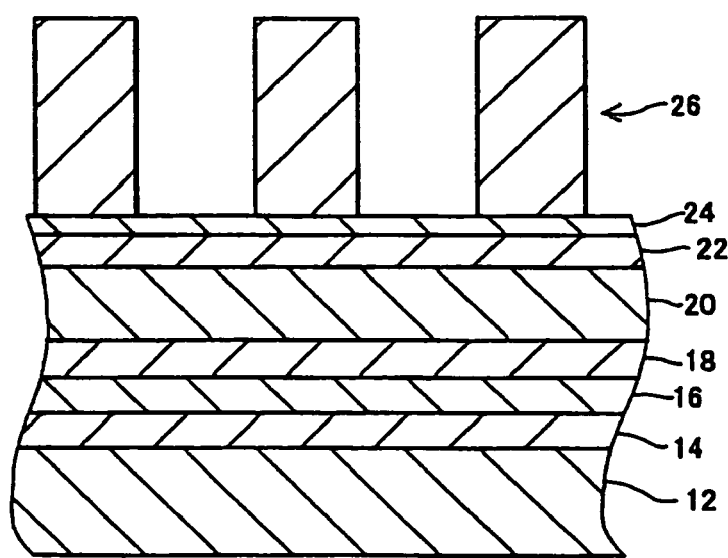
FIG. 9 is a side cross-sectional view schematically showing the shape of the object to be processed in which the resist layer at the bottom of grooves has been removed.

More specifically, first, the ashing device 44 removes the resist layer 26 at the bottom of the grooves, as shown in FIG. 9 (S102). Although the resist layer 26 is also removed in regions other than the grooves, the resist layer 26 corresponding to steps between the grooves and those regions is left in those regions.

Figure 10:
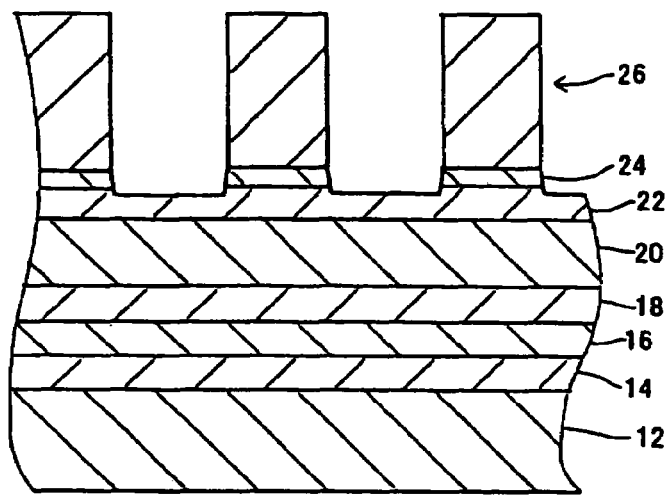
FIG. 10 is a side cross-sectional view schematically showing the shape of the object to be processed in which the second mask layer at the bottom of concave portions has been removed.

Then, the reactive ion etching device 46 removes the second mask layer 24 at the bottom of the grooves, as shown in FIG. 10 (S104). In this step, the first mask layer 22 is also removed slightly. In addition, the resist layer 26 in the regions other than the grooves is also removed slightly, but it is left. Since the process of the second mask layer 24 uses a fluorinated gas as a reactive gas, it does not always require wet cleaning using water or the like, unlike a case in which a chlorinated gas is used as a reactive gas. That is, dry cleaning is sufficient, which will be described later. Therefore, all the steps for processing the object to be processed 10 can be achieved by dry processes, thus improving the production efficiency.

Figure 11:
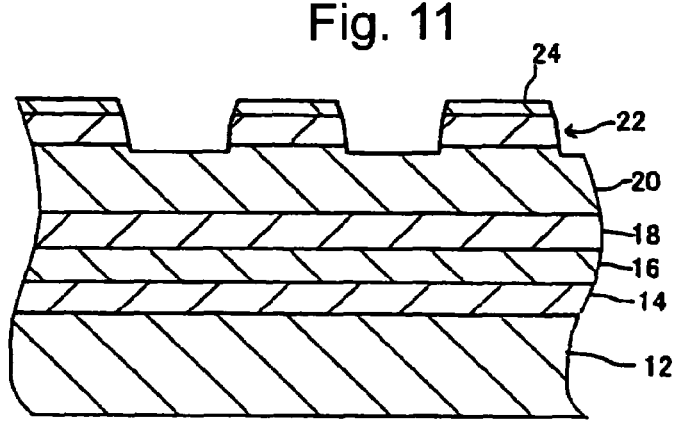
FIG. 11 is a side cross-sectional view schematically showing the shape of the object to be processed in which the first mask layer at the bottom of the grooves has been removed.

Then, the reactive ion etching device 48 removes the first mask layer 22 at the bottom of the grooves and removes the resist layer 26 in the regions other than the grooves, as shown in FIG. 11 (S106). Although the second mask layer 24 in the regions other than the grooves is also removed slightly, the most part of the second mask layer 24 is left in those regions. The first mask layer 22 is made of DLC, and the resist layer 26 is made of a resin resist material. Both of those materials have high etching rates with respect to reactive ion etching using oxygen as a reactive gas. Thus, the removal of the first mask layer 22 at the bottom of the grooves and the removal of the resist layer 26 in the regions other than the grooves can simultaneously be performed. Therefore, good production efficiency is achieved.

Moreover, since the second mask layer 24 made of silicon that has a low etching rate with respect to reactive ion etching using oxygen as a reactive gas is formed on the first mask layer 22, the first mask layer 22 in the regions other than the grooves is left in a good shape.

As described above, by providing two mask layers, i.e., the first and the second mask layers 22 and 24, it is possible to expand the range of choices for the mask materials and the type of reactive gas.

Figure 12:
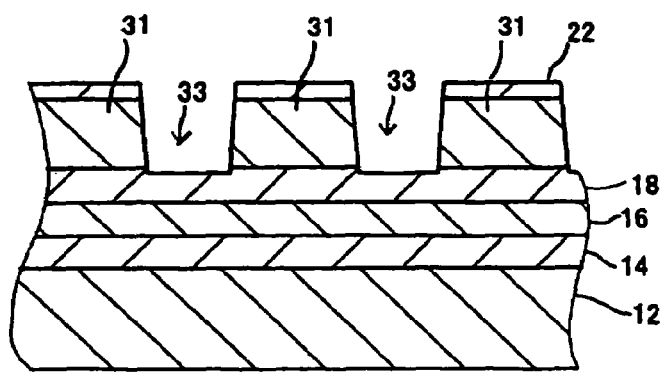
FIG. 12 is a side cross-sectional view schematically showing the shape of the object to be processed in which divided recording elements have been formed.

Next, the ion beam etching device 50 removes the continuous recording layer 20 at the bottom of the grooves, as shown in FIG. 12, so that the continuous recording layer 20 is divided into a number of recording elements 31 and groove portions 33 are formed between the divided recording elements 31 (S108).

In this step, the second mask layer 24 in the regions other than the grooves is completely removed and the most part of the first mask layer 22 in those regions is also removed. However, the small amount of the first mask layer 22 can be left on the upper surface of the divided recording elements 31.

The first mask layer 22 has a lower etching rate with respect to ion beam etching than that of the continuous recording layer 20 because the first mask layer 22 is made of DLC. This allows the first mask layer 22 to be formed more thinly. Moreover, the second mask layer 24 is made of silicon and has a higher etching rate with respect to ion beam etching than that of the continuous recording layer 20. Thus, the second mask layer 24 can be removed in a short time. However, even in the case where the second mask layer 24 is made of a material having an etching rate with respect to ion beam etching that is approximately equal to or lower than that of the continuous recording layer 20, the second mask layer 24 can be removed in a short time if it is formed to have the minimum thickness in the range that enables the second mask layer 24 to be left in the step of removing the resist layer and processing the first mask layer (S106). Furthermore, the resist layer 26 on the second mask layer 24 has already been removed.

That is, the covering component that covers the continuous recording layer 20 has become substantially thinner. Thus, an area in the shadow of ion beams incident from a direction inclined from the normal of the surface of the object to be processed 10 is small. Accordingly, a tapered angle of the side face of each divided recording element 31 can be suppressed.

In addition, since the covering component covering the continuous recording layer 20 has become thin, the amount of particles that are re-deposited on the side faces of the covering component in ion beam etching is small. Thus, formation of an edge-like step portion in the peripheral portion of the divided recording element 31 can be prevented or reduced. Moreover, if the thickness of the first mask layer, a setting condition of ion beam etching, and the like are adjusted so as to make the remaining amount of the first mask layer on the divided recording elements 31 as small as possible, it is possible to further reduce the particles re-deposited on the side faces of the first mask layer and further suppress the formation of the edge-like step portion in the peripheral portion of the divided recording element 31.

In ion beam etching, the process precision is less sensitive to the shape of the object to be processed 10, as compared with that in reactive ion etching. Therefore, ion beam etching can uniformly process the entire region of every object to be processed 10 with high precision.

Moreover, in ion beam etching, the process temperature is lower than that in reactive ion etching using Co gas or the like as a reactive gas. Thus, magnetic degradation of the divided recording elements 31 caused by overheating can be prevented or reduced.

Furthermore, in ion beam etching, etching of a magnetic material progresses faster, as compared with that in reactive ion etching using CO gas or the like as a reactive gas. Thus, ion beam etching achieves improved production efficiency.

Please note that, when the continuous recording layer 20 is processed, the seed layer 18 is also removed slightly.

Figure 13:
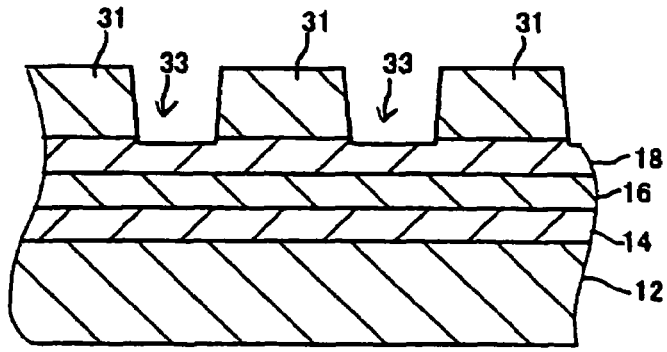
FIG. 13 is a side cross-sectional view schematically showing the shape of the object to be processed in which the first mask layer on the divided recording elements has been removed.

Next, the ashing device 52 completely removes the first mask layer 22 remaining on the divided recording elements 31, as shown in FIG. 13 (S110).

Then, by using the dry cleaning device 54, foreign objects on the surface of the divided recording elements 31 are removed (S112).

Figure 14:
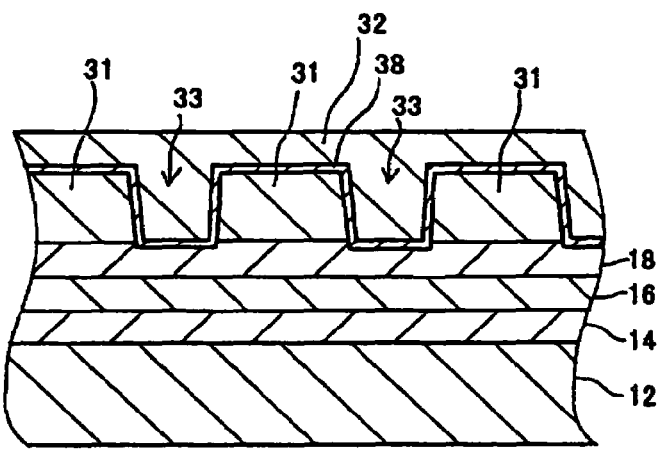
FIG. 14 is a side cross-sectional view schematically showing the shape of the object to be processed in which portions between the divided recording elements have been filled with a non-magnetic material.

Then, as shown in FIG. 14, the barrier formation device 56 deposits the barrier 38 of DLC on the divided recording elements 31 to have a thickness of 1 to 20 nm (S114), and the non-magnetic material filling device 58 fills the groove portions 33 between the divided recording elements 31 with a non-magnetic material 32 (S116). Please note that the non-magnetic material 32 is deposited to completely cover the barrier 38. The divided recording elements 31 are not damaged by bias sputtering of the non-magnetic material 32 because they are covered and protected by the barrier 38.

Figure 15:
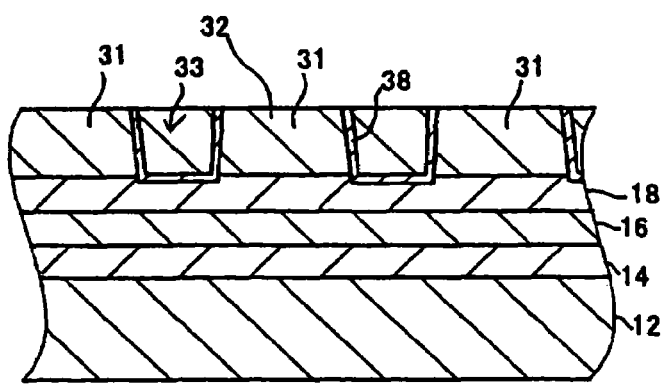
FIG. 15 is a side cross-sectional view schematically showing the shape of the object to be processed in which the surfaces of the divided recording elements and the non-magnetic material have been flattened.

Then, the flattening device 60 removes the non-magnetic material 32 to the upper surface of the divided recording elements 31, as shown in FIG. 15, so that the surfaces of the divided recording elements 31 and the non-magnetic material 32 are flattened (S118). In this step, in order to perform flattening with high precision, it is preferable that an incident angle of Ar ions be set to fall within a range of from −10° to 15°. On the other hand, in the case where good flatness of the surfaces of the divided recording elements 31 and the non-magnetic material 32 has already been achieved in the non-magnetic material filling step, the incident angle of Ar ions may be set to fall within a range of from 30° to 90°. By doing so, the processing rate can be increased to improve the production efficiency. Please note that the term "incident angle" is used to mean an incident angle with respect to the surface of the object to be processed and an angle formed by the surface of the object to be processed and the central axis of ion beams. For example, when the central axis of ion beams is parallel to the surface of the object to be processed the incident angle is 0°. Please note that the barrier 38 on the divided recording elements 31 may be removed completely or partially. On the other hand, the non-magnetic material 32 on the upper surface of the divided recording elements 31 are completely removed.

Then, the protection layer formation device 62 forms the protection layer 34 of DLC to have a thickness of 1 to 5 nm on the upper surfaces of the divided recording elements 31 and the non-magnetic material 32 (S120). Then, the holder 68 is transported to the outside of the vacuum chamber 70, and the respective objects to be processed 10 are detached from the holder 68.

Furthermore, the lubricating layer 36 of PFPE is applied to have a thickness of 1 to 2 nm on the protection layer 34 by dipping using the lubricating layer formation device 64. In this way, the magnetic recording medium 30 shown in FIG. 2 is completed.

As described above, by using ion beam etching for processing the continuous recording layer 20, it is possible to uniformly process the object to be processed with high precision while suppressing magnetic degradation. Moreover, when the process temperature of the continuous recording layer 20 is high, a cooling apparatus is needed to limit the magnetic degradation. On the other hand, when a plurality of objects to be processed are simultaneously processed, it is difficult to provide a cooling apparatus including an ESC (electrostatic chuck) and a bias application apparatus due to the space, process precision, and the like. However, when ion beam etching is used for processing the continuous recording layer 20, the process temperature of the continuous recording layer 20 can be lowered, thus eliminating the need of such a cooling apparatus. Therefore, it is possible to simultaneously process a plurality of objects to be processed with high precision. This enables mass-production of a discrete type magnetic recording medium.

In addition, by making the covering component on the continuous recording layer 20 substantially thinner, the divided recording elements can be processed in a good shape.

The use of DLC for the material for the first mask layer can reduce the thickness of the first mask layer and can further improve the process precision of the divided recording elements.

Since the formation of the divided recording elements 31 and the like are performed in a state in which the surrounding of the object to be processed 10 is kept vacuum, degradation of the divided recording elements 31 caused by the process, such as oxidation, corrosion, and the like can be prevented.

Since all the steps are dry processes, transport and the like of the object to be processed are performed more easily, as compared with a manufacturing process that includes a wet process and a dry process. Thus, the manufacturing apparatus 40 provides good production efficiency for that reason.

In the present exemplary embodiment, the first mask layer 22 is removed after the continuous recording layer 20 has been processed. However, the present invention is not limited thereto. The first mask layer 22 may be used as a part of the protection layer 34 without removing the first mask layer 22.

In the present exemplary embodiment, the first mask layer 22 is formed of DLC. However, the present invention is not limited thereto. The first mask layer 22 may be made of another material as long as it has a low etching rate with respect to ion beam etching.

In the present exemplary embodiment, two mask layers, i.e., the first and second mask layers 22 and 24 are formed on the continuous recording layer 20. However, the present invention is not limited thereto. The second mask layer may be omitted to achieve a mask layer having a single layer structure, as long as a material having a low etching rate with respect to both ion beam etching and the resist layer removal step is chosen as the material for the first mask layer 22.

In the present exemplary embodiment, the resist layer 26 remaining in the regions other than the grooves is removed by reactive ion etching. However, the present invention is not limited thereto. The resist layer 26 may be removed by another dry etching technique, or may be removed by being dissolved in a dissolving agent. In the latter case, if a material having a low etching rate with respect to that dissolving agent is chosen as the material for the first mask layer 22, the second mask layer may be omitted to achieve a mask layer having a single layer structure.

In the present exemplary embodiment, the underlayer 14 and the soft magnetic material layer 16 are formed under the continuous recording layer 20. However, the present invention is not limited thereto. The structure under the continuous recording layer 20 may be appropriately changed depending on the type of magnetic recording medium. For example, one of the underlayer 14 and the soft magnetic material layer 16 may be omitted. Alternatively, the continuous recording layer may be formed directly on the substrate.

In the present exemplary embodiment, ion beam etching is used for processing the continuous recording layer 20. However, the present invention is not limited thereto. In the case where the continuous recording layer is processed by another dry etching technique, the effect of improving the process precision of the divided recording elements can be achieved by performing process such as removal of the resist layer on the mask layer before the process of the continuous recording layer so as to make the covering component on the continuous recording layer thinner.

In the present exemplary embodiment, the magnetic recording medium 30 is a perpendicular recording, discrete track type magnetic disc in which the divided recording elements 31 are arranged side by side at fine intervals in the track-radial direction. However, the present invention is not limited thereto. The present invention can be also applied to manufacturing of a magnetic disc in which divided recording elements are arranged side by side at fine intervals in the circumferential direction of tracks (sector direction), a magnetic disc in which divided recording elements are arranged side by side at fine intervals both in the radial direction and the circumferential direction of tracks, and a magnetic disc in which divided recording elements are arranged spirally. Moreover, the present invention can be applied to manufacturing of a magnetooptical disc such as an MO, a heat-assisted recording disc that uses magnetism and heat, and other discrete type magnetic recording media having shapes different from a disc-like shape, such as a magnetic tape.

In the present exemplary embodiment, the manufacturing apparatus 40 of a magnetic recording medium includes separate processing devices for the respective steps. However, the present invention is not limited thereto. Alternatively, a single device may perform processes in two or more steps. For example, the step of removing the resist layer 26 at the bottom of the grooves and the step of removing the first mask layer 22 remaining on the divided recording elements 31 may be performed by the same ashing device. Moreover, the step of processing the continuous recording layer 20 and the step of flattening the divided recording layer 31 and the non-magnetic material 32 may be performed by the same ion beam etching device using Ar gas. Furthermore, the process of the second mask layer 24, the process of the first mask layer 22, and the removal of the resist layer 26 may be performed by using the same reactive ion etching device while changing a reactive gas. By doing so, the manufacturing apparatus can be made compact, and the cost of the manufacturing apparatus can be reduced.

EXAMPLE

In the manner described in the above exemplary embodiment, a magnetic recording disc was manufactured. The thickness of the continuous recording layer 20 was approximately 20 nm, the thickness of the first mask layer 22 was approximately 10 nm, the thickness of the second mask layer 24 was approximately 5 nm, and the thickness of the resist layer 26 was approximately 100 nm.

For each of the processes of the second mask layer 24, the first mask layer 22, and the continuous recording layer 20, the process temperature of the object to be processed 10 and the time required for the process are shown below.

The second mask layer 24: 50° C. or less, approximately 5 seconds (Reactive gas: $SF_6$)

The first mask layer 22: 50° C. or less, approximately 10 seconds (Reactive gas: $O_2$)

The continuous recording layer 20: approximately 120° C. or less, approximately 30 seconds (Ar ion beams)

Figure 16:
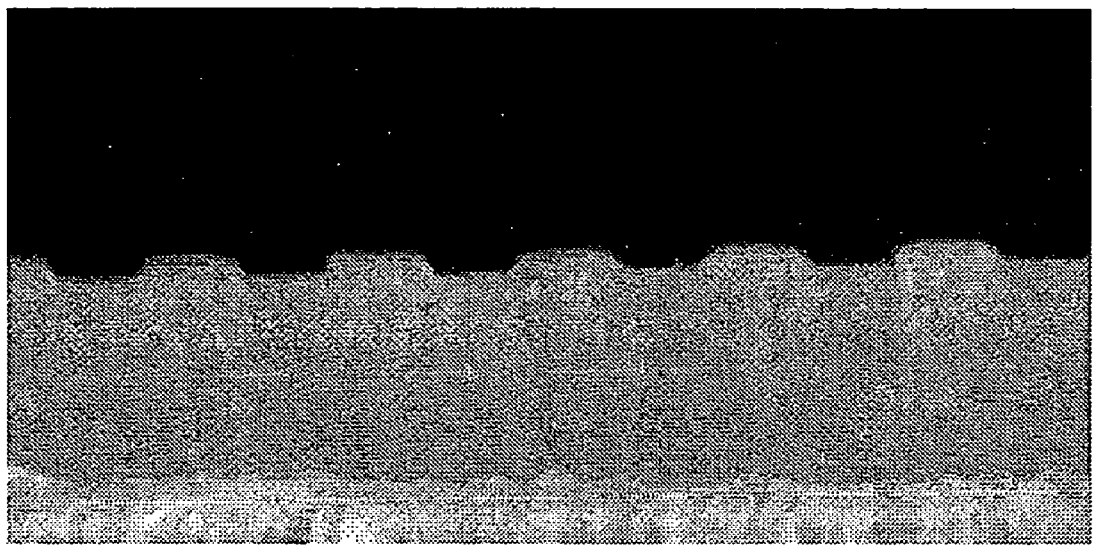
FIG. 16 is a microphotograph showing a shape of a divided recording element of a magnetic recording disc according to Example of the present invention while enlarging it.

FIG. 16 is a microphotograph showing the shape of the divided recording element of that magnetic recording disc while enlarging it. It was confirmed that no edge-like step portion was formed in the peripheral portion of each divided recording element, the tapered angle of the side face of each divided recording element was suppressed, and each divided recording element was processed in a good shape.

Figure 17:
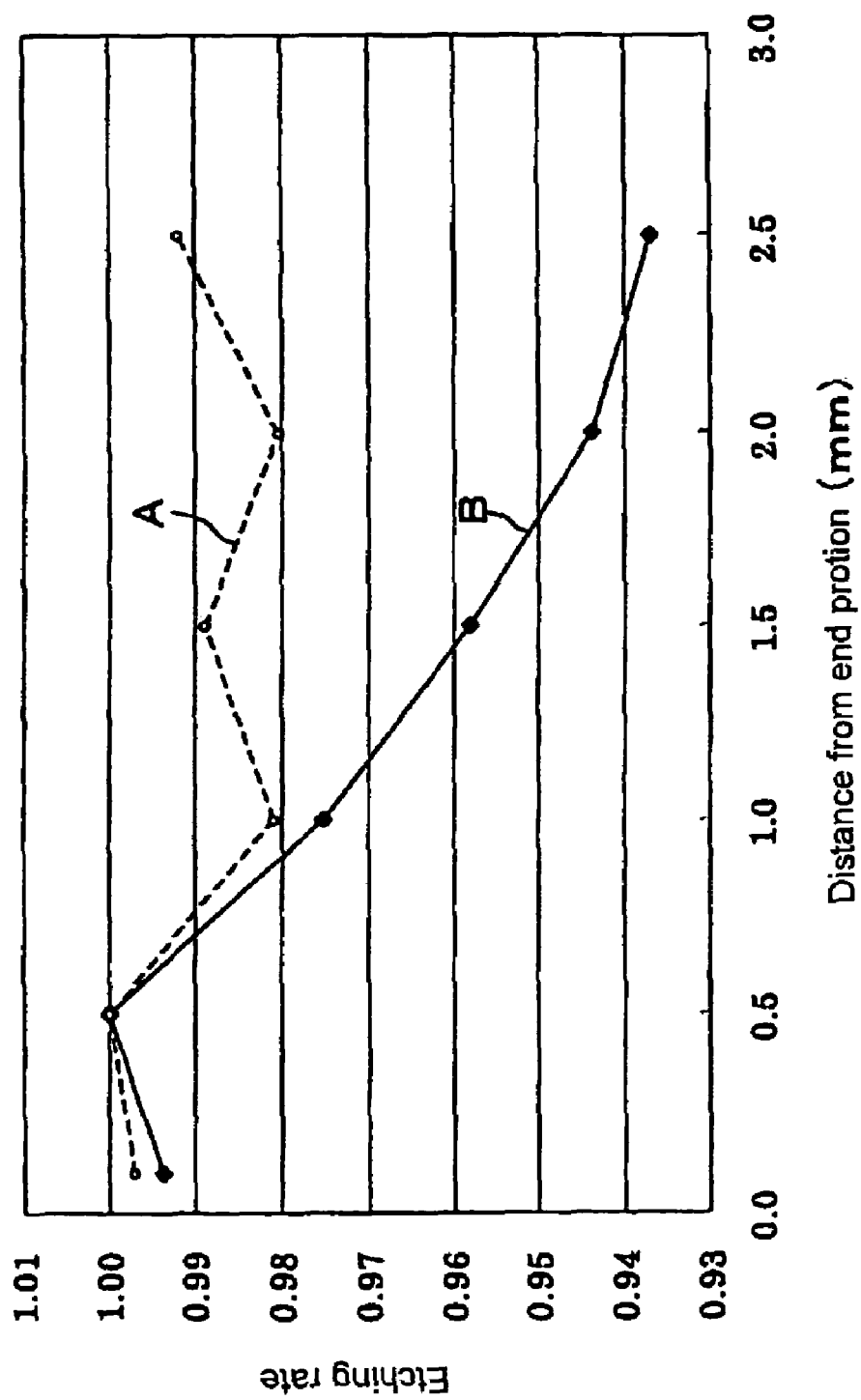
FIG. 17 is a graph showing a relationship between a distance from an end of a magnetic recording disc and an etching rate of a continuous recording layer for each of the above magnetic recording disc and a magnetic recording disc of Comparative Example 1.

The relationship between the distance from the end of the magnetic recording disc and the etching rate of the continuous recording layer is shown with Curve A in FIG. 17. Although the etching rate of the continuous recording layer varied slightly, the tendency for the etching rate to increase or decrease with increase or decrease of the distance from the end was not found. Please note that FIG. 17 shows relative etching rates in various portions as values in a range of from 0 to 1, assuming that the etching rate of the portion at which etching progresses faster than any other portions is 1. FIG. 17 does not show the absolute value of the etching progress rate.

The line width and the space width (groove width) at the bottom of the resist layer 26, the first mask layer 22, and the continuous recording layer 20 (divided recording elements 31) are shown in Table 1. The line width and the space width at the bottom of the resist layer 26 were measured after the resist layer processing step (S102) and before the second mask layer processing step (S104). The line width and the space width at the bottom of the first mask layer 22 were measured after the step (S106) serving as both the resist layer removal step and the first mask layer processing step and before the continuous recording layer processing step (S108). The line width and the space width at the bottom of the continuous recording layer 20 (divided recording elements 31) were measured after the continuous recording layer processing step (S108) and before the first mask layer removal step (S110).

Figure 18:
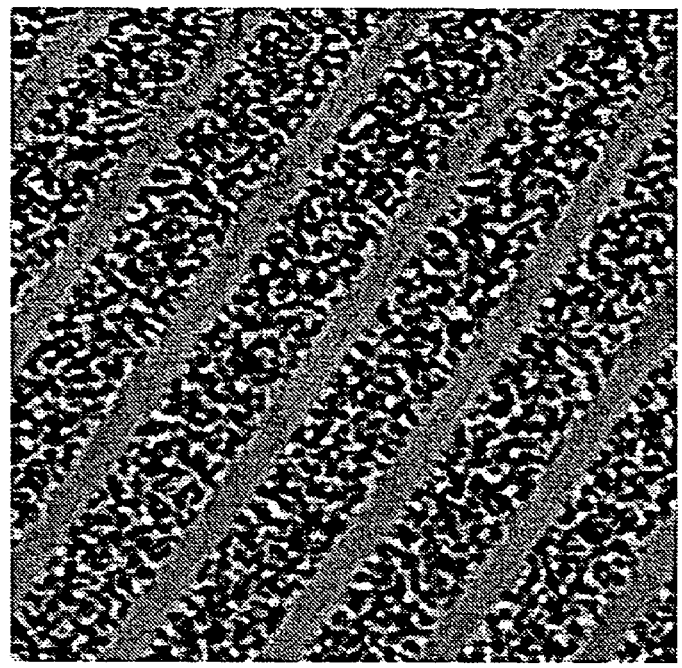
FIG. 18 shows an MFM image of the magnetic recording medium of Example of the present invention.

FIG. 18 shows an MFM image of that magnetic recording disc. It was confirmed that regions like minute spots of different shading were uniformly dispersed and the magnetic characteristics were good.

TABLE 1

|  | Example | | Comparative Example 1 | |
| --- | --- | --- | --- | --- |
|  | Line width | Space width | Line width | Space width |
| Bottom of resist layer | 75 | 75 | 75 | 75 |
| Bottom of the first mask layer | 78 | 72 | 92 | 58 |
| Bottom of divided recording element | 80 | 70 | 101 | 49 |

Comparative Example 1

Unlike Example described above, the continuous recording layer 20 was processed by reactive ion etching using CO gas or the like as a reactive gas. The first mask layer 22 was made of Ta (tantalum) to have a thickness of approximately 25 nm, and was processed by reactive ion etching using $SF_6$ gas as a reactive gas. The first mask layer 22 remaining on the divided recording elements 31 was also removed by ashing using $SF_6$ gas as a reactive gas. The second mask layer 24 was formed of Ni (nickel) to have a thickness of approximately 10 nm, and was processed by ion beam etching. In the above reactive ion etching, the object to be processed 10 was cooled by means of a cooling apparatus, and the objects to be processed 10 were processed one by one. Except for the above, the conditions were the same as those in Example.

For each of the processes of the second mask layer 24, the first mask layer 22, and the continuous recording layer 20, the process temperature of the object to be processed 10 and the time required for the process are shown below.

The second mask layer 24: approximately 90° C., approximately 30 seconds (Ar ion beams)

The first mask layer 22: 120° C. or less, approximately 20 seconds (Reactive gas: $SF_6$ gas)

The continuous recording layer 20: 250° C. to 300° C., approximately 60 seconds (Reactive gas: CO gas or the like)

The manufactured magnetic recording disc had a diameter of approximately 2.5 inches. Warpage of that magnetic recording disc was approximately 10 μm.

The relationship between the distance from the end of that magnetic recording disc and the etching rate of the continuous recording layer is shown with Curve B in FIG. 17. It was confirmed that the etching rate of the continuous recording layer tended to increase as the distance from the end became smaller. In other words, at the end of the object to be processed, the etching rate was larger than that in the other portions and variation in the processed dimensions became largely. Therefore, a region near the end cannot be used as a magnetic recording region in some cases. This reduces the recording capacity.

The line width and the space width (groove width) at the bottom of the resist layer 26, the first mask layer 22, and the continuous recording layer 20 (divided recording elements 31) are shown in Table 1.

Figure 19:
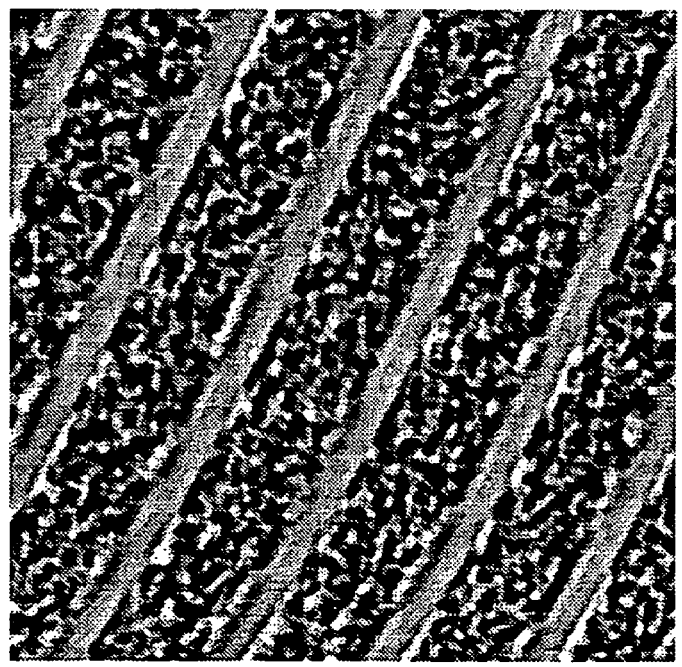
FIG. 19 shows an MFM image of the magnetic recording medium of Comparative Example 1.

In addition, an MFM image of that magnetic recording disc is shown in FIG. 19. It was confirmed that, although the minute regions of different shading-were dispersed, a part of them was arranged in a line extending along the periphery of the divided recording element and the magnetic degradation occurred.

In other words, it was confirmed that the magnetic recording disc of Example was better in the magnetic characteristics than the magnetic recording disc of Comparative Example 1. This is because the time required for processing the respective mask layers and the continuous recording layer in Example was shorter than that in Comparative Example 1 and the process temperature in Example was lower than that in Comparative Example 1. It should be noted that, in Comparative Example 1, the process temperature was suppressed in the continuous recording layer processing step by using a cooling apparatus, as described above. That is, if the continuous recording layer were processed by reactive ion etching using no cooling apparatus as in Example, the process temperature would further increase and the magnetic degradation of the magnetic recording disc of Comparative Example 1 would become larger.

Moreover, in the magnetic recording disc of Example, the shape of the divided recording elements was more stable than that in the magnetic recording disc of Comparative Example 1. Also, variation in the shape between the portions in the magnetic recording disc of Example was smaller than that in Comparative Example 1. This is because variation of the etching rate of the continuous recording layer between portions was less in Example than in Comparative Example 1.

Furthermore, as shown in Table 1, although the space width at the bottom of the resist layer 26 in Example was the same as that in Comparative Example 1, the space width at the bottom of the continuous recording layer 20 (divided recording element 31) in Example was larger than that in Comparative Example 1. In other words, the transfer precision was better in Example than in Comparative Example 1. The reason for this is considered as follows. In Example, the first mask layer 22 was formed of DLC and the second mask layer 24 was formed of Si. Thus, the thickness of the first mask layer 22 and that of the second mask layer 24 could be made thinner, as compared with those in Comparative Example 1. This contributed to suppression of the tapered angle of the side face of the portion to be processed.

Comparative Example 2

A magnetic recording disc was manufactured under the same conditions as those in Example, except that the first mask layer was formed to have a thickness of 50 nm.

Figure 20:
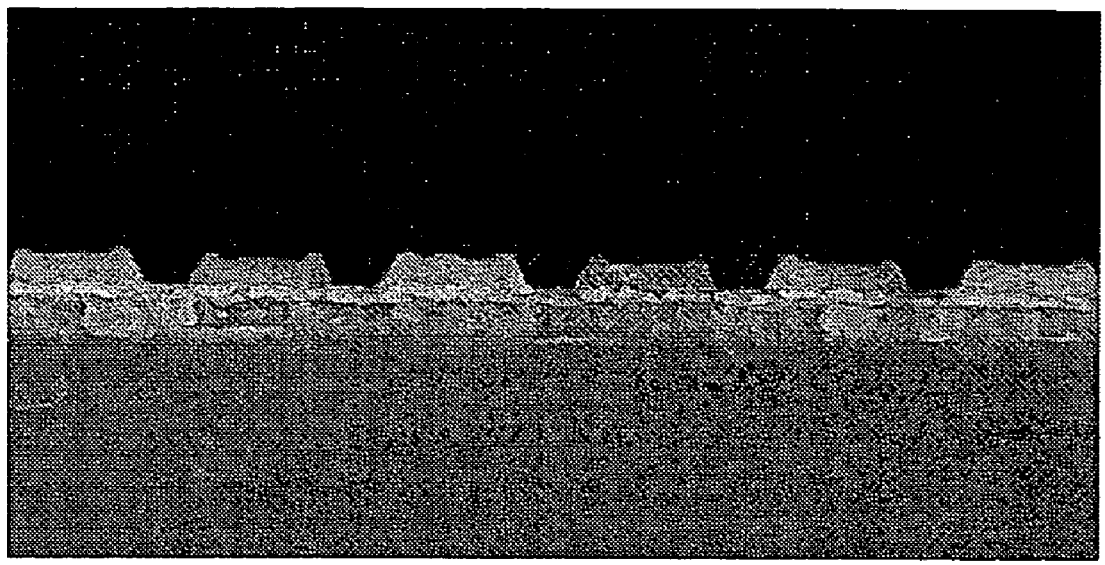
FIG. 20 is a microphotograph showing a shape of a divided recording element of a magnetic recording disc of Comparative Example 2 while enlarging it.

FIG. 20 is a microphotograph showing the shape of the divided recording element of that magnetic recording disc while enlarging it. It was confirmed that an edge-like step portion was formed along the peripheral portion of each divided recording element.

Comparative Example 3

A magnetic recording disc was manufactured under the same conditions as those in Example, except that the resist layer 26 was formed directly on the continuous recording layer 20 without forming the first and second mask layers 22 and 24 and the continuous recording layer 20 was processed in a predetermined pattern by ion beam etching using the resist layer 26 as mask.

Figure 21:
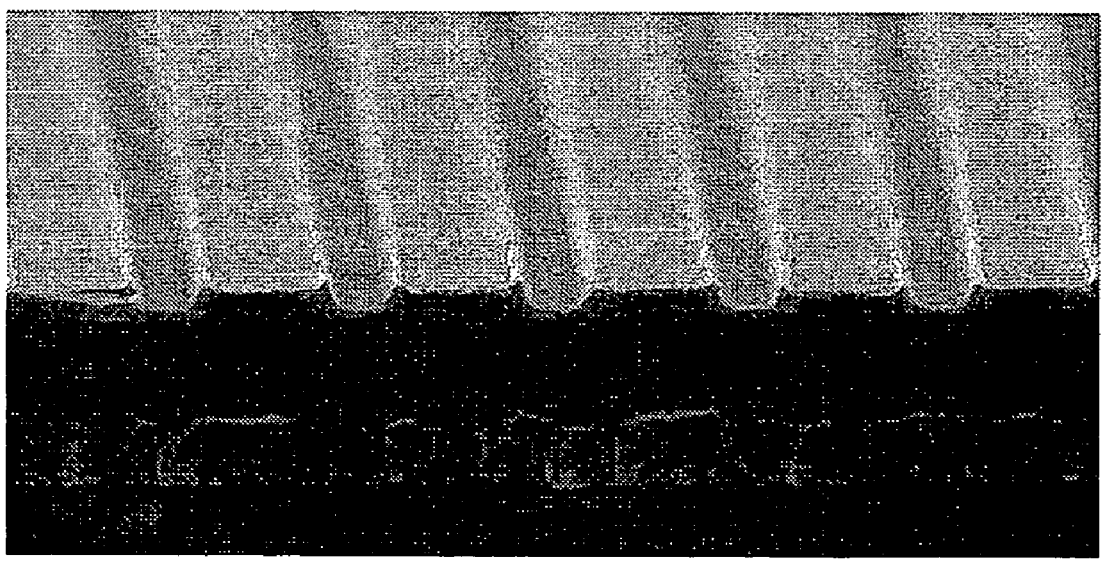
FIG. 21 is a microphotograph showing a shape of a divided recording element of a magnetic recording disc of Comparative Example 3 while enlarging it.
Figure 22:
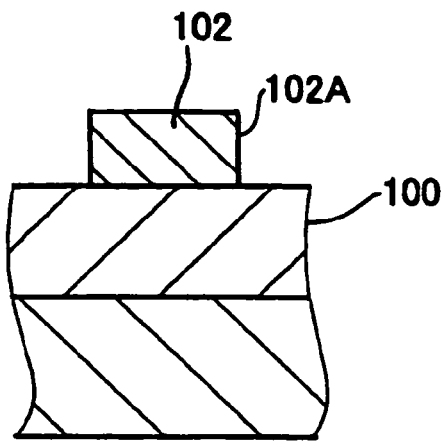
FIG. 22A is a side cross-sectional view schematically showing a state in which in order to process a continuous recording layer by a conventional dry etching technique, the continuous recording layer is partially covered with a mask.
FIG. 22B is a side cross-sectional view schematically showing deposition of particles on the side face of the mask.
FIG. 22C is a side cross-sectional view schematically showing a formed recording element and a step portion in the peripheral portion of the recording element.
Figure 22:
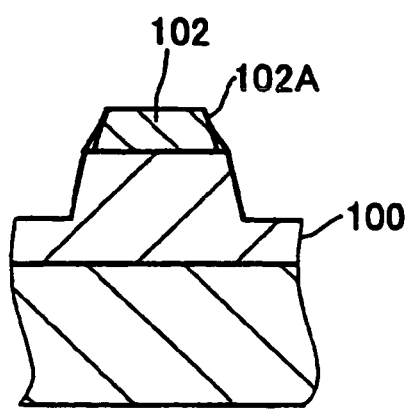
Figure 22:
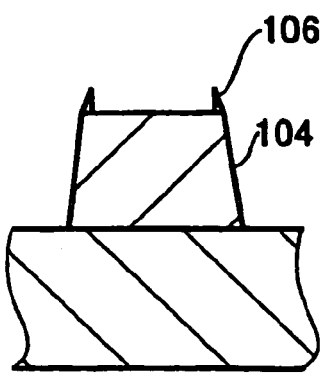
Figure 23:
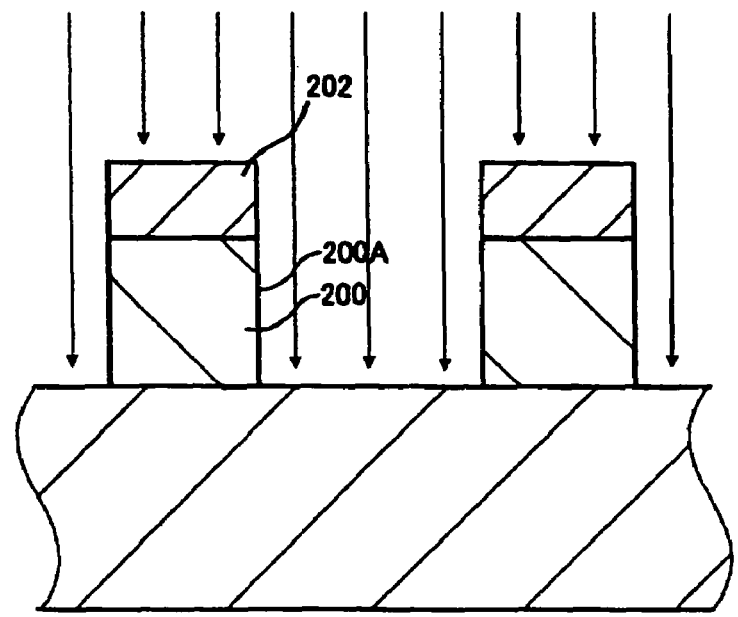
FIG. 23A is a side cross-sectional view schematically showing an ideal formation process of the divided recording elements by a conventional dry etching technique.
FIG. 23B is a side cross-sectional view schematically showing an actual formation process of the divided recording elements by the conventional dry etching technique.
Figure 23:
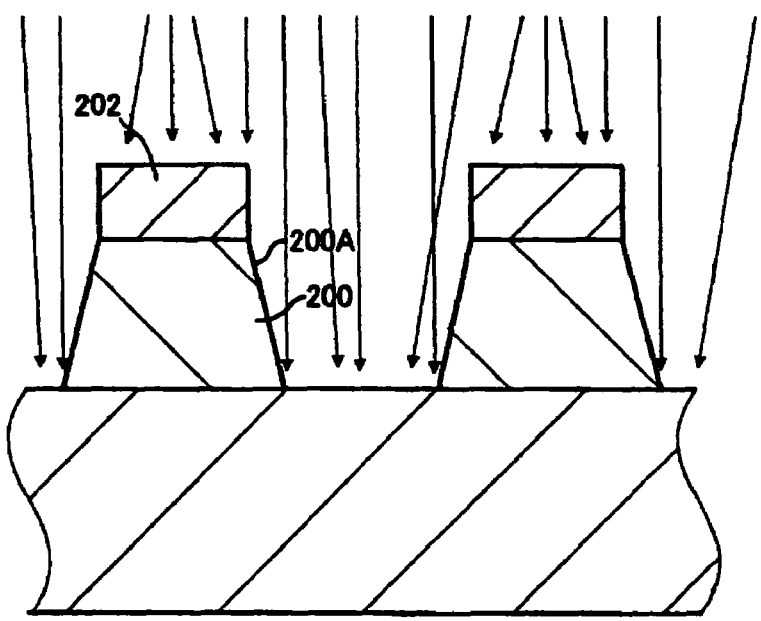

FIG. 21 is a microphotograph showing the shape of the divided recording element of that magnetic recording disc while enlarging it. It was confirmed that an edge-like step portion that extended more than that in Comparative Example 2 was formed along the peripheral portion of each divided recording element.

In other words, it was confirmed that the shape of the divided recording elements in the magnetic recording disc of Example was better than those in Comparative Examples 2 and 3. This is because the thickness of the covering component covering the continuous recording layer is thinner in Example than in Comparative Examples 2 and 3.

In Example, the thickness of the first mask layer 22 was 10 nm. Thus, it is found that the divided recording elements can be surely processed in a good shape by setting the thickness of the first mask layer 22 to 10 nm or less. Moreover, it is considered that the divided recording elements can be processed in an approximately good shape when the first mask layer 22 is formed to be thinner than the recording layer. In a case of a discrete track medium or a patterned medium, the thickness of the recording layer is considered to be about 20 nm. However, this thickness has become smaller with the increase of the areal density, and the recording layer having a thickness of about 15 nm is considered. Therefore, in a case of a discrete track medium or a patterned medium, it is considered that the divided recording elements can be processed in an approximately good shape by setting the thickness of the first mask layer 22 to 15 nm or less. Please note that in order for the first mask layer 22 to serve as a mask layer in dry etching, it is preferable that the first mask layer 22 be formed to have a thickness of 3 nm or more.

INDUSTRIAL APPLICABILITY

The present invention can be applied to the manufacturing of a magnetic recording medium that includes a recording layer divided into a number of divided recording elements.

The invention claimed is:

1. A manufacturing method of a magnetic recording medium comprising:
   a resist layer processing step of processing a resist layer of an object to be processed in a predetermined pattern, in the object a continuous recording layer, a first mask layer, a second mask layer, and the resist layer being formed on a surface of a substrate in that order;
   a second mask layer processing step of processing the second mask layer in the pattern based on the resist layer;
   a resist layer removal step of removing the resist layer on the second mask layer completely and processing the first mask layer in the pattern based on the second mask layer; and
   a continuous recording layer processing step of processing the continuous recording layer in the pattern by dry etching based on the first mask layer to divide the continuous recording layer into a number of divided recording elements, wherein
   the second mask layer having a lower etching rate in the resist layer removal step than that of the first mask layer;
   the first mask layer having a lower etching rate in the continuous recording layer processing step than that of the continuous recording layer; and
   the resist layer removal step is performed before the continuous recording layer processing step.

2. The manufacturing method of a magnetic recording medium according to claim 1, wherein:
   the first mask layer is formed to be thinner than the continuous recording layer.

3. The manufacturing method of a magnetic recording medium according to claim 2, wherein
   the first mask layer has a thickness t that satisfies $3 \leq t \leq 15$ nm.

4. The manufacturing method of a magnetic recording medium according to claim 2, wherein
   the first mask layer has a thickness t that satisfies $3 \leq t \leq 10$ nm.

5. The manufacturing method of a magnetic recording medium according to claim 2, wherein
   the first mask layer is made of diamond like carbon.

6. The manufacturing method of a magnetic recording medium according to claim 1, wherein
   the continuous recording layer processing step processes the continuous recording layer by ion beam etching.

7. The manufacturing method of a magnetic recording medium according to claim 1, wherein
   the resist layer processing step processes the resist layer by imprinting.

8. The manufacturing method of a magnetic recording medium according to claim 1, wherein
   a plurality of objects to be processed are simultaneously processed.

9. The manufacturing method of a magnetic recording medium according to claim 1, wherein
   the resist layer removal step removes the resist layer and processes the first mask layer by employing reactive ion etching which uses one of oxygen and ozone as a reactive gas.

10. The manufacturing method of a magnetic recording medium according to claim 1, wherein
    the second mask layer on the first mask layer is removed completely in the continuous recording layer processing step.

11. The manufacturing method of a magnetic recording medium according to claim 1, wherein
    the second mask layer is formed of a silicon-based material that comprises at least one of silicon or a silicon compound.

12. The manufacturing method of a magnetic recording medium according to claim 1, wherein
    the second mask layer processing step processes the second mask layer by employing reactive ion etching which uses a fluorinated gas as a reactive gas.

* * * * *